United States Patent
Valdespino

[15] 3,659,714
[45] May 2, 1972

[54] LIQUID WASTE TREATMENT APPARATUS

[72] Inventor: Joseph M. Valdespino, Suite E 3609 Old Winter Garden Road, Orange County, Fla. 32805

[22] Filed: May 1, 1970

[21] Appl. No.: 33,622

[52] U.S. Cl. ............................210/107, 210/138, 210/184, 210/199, 210/269, 210/297, 210/316
[51] Int. Cl. .......................................................B01d 33/02
[58] Field of Search..................210/67, 68, 71, 97, 104, 106, 210/107, 138, 170, 179, 184, 185, 269, 297, 199, 365–367, 316

[56] References Cited

UNITED STATES PATENTS

| | | | |
|---|---|---|---|
| 3,568,838 | 3/1971 | Appelgren et al.............. | 210/179 X |
| 1,253,428 | 1/1918 | Salcines....................... | 210/104 |
| 2,804,210 | 8/1957 | Shaughnessy................. | 210/297 X |
| 2,179,436 | 11/1939 | Smith........................... | 210/67 X |
| 3,234,716 | 2/1966 | Sevin et al. ................... | 210/297 |

Primary Examiner—John Adee
Attorney—Duckworth and Hobby

[57] ABSTRACT

A sewage treatment apparatus having an input tank with mixing and screen filtering means for receiving liquid waste such as raw sewage. The level of liquid waste in the input tank controls a timer which activates a valve to release the screened sewage into a filter centrifuge for rapidly separating liquids and solids in the liquid waste. The solids separated are burned and vacuumed from the filter centrifuge following filtering of the liquid through a filter medium located in the centrifuge. A high speed perforated drum centrifuge is lined with a filter material such as sand and the drum may have vanes on its periphery to form an impeller to act in conjunction with a diffuser casing to form a centrifugal pump integral with the filter.

11 Claims, 3 Drawing Figures

PATENTED MAY 2 1972

JOSEPH M. VALDESPINO
INVENTOR by Duckworth & Hobby

Attorneys

PATENTED MAY 2 1972

JOSEPH M. VALDESPINO
INVENTOR

BY Duckworth & Hobby
Attorneys

LIQUID WASTE TREATMENT APPARATUS

BACKGROUND OF THE INVENTION

The present invention relates to treatment of liquids and especially to a liquid waste treatment system for sewage and being adapted to replace septic tanks, or shipboard or other waste treatment systems.

In the past it has been common in private sewage systems to treat the liquid waste of a building disposal system in septic or settling tanks which are designed for the removal of larger solids from the effluent. These solids are typically trapped by either sludge which accumulates at the bottom of the tank or scum which is a floating mat of solids on the surface of the fluids. The septic tank traps and stores the solids during decomposition by bacterial and natural processes prior to eventual removal. The effluent with the larger solids removed is discharged from the septic tank into a leaching system where it may be absorbed into the soil. Leaching may be accomplished by a soil absorption field which generally has several lines of sub-surface drain tiles with open joints placed on the surface of the ground and surrounded by gravel, broken bricks, or the like, so that the septic tank effluent may seep into the surrounding soil. Leaching may also be accomplished by means of a seepage pit which is a covered pit with open jointed linings through which the septic tank effluent may seep or leach into the surrounding poorer soil. These systems also sometimes employ grease traps to prevent premature failure of the septic tank system from the accumulation of greases and other methods. Circulation through the soil removes disease-producing bacteria which in time tend to die out in the unfavorable environment afforded by the soil. This results in eventual purification of sewage effluent. However, if the system is located near a water supply or near a source of water supply used for drinking, growing shell fish or swimming, the effluent reaching such areas may not have been filtered sufficiently by the soil to decrease harmful bacteria to a safe level and in addition the soluble nutrients such as nitrates and phosphates tend to reach these bodies of water having a profound effect on the BOD or biological oxygen demand of the water and increasing the rapid growth of weeds, unicellular algae and the like. More and more communities are putting severe restrictions on septic tank systems, requiring larger acreage of land for septic tanks or requiring utilization of a governmental or private sewage system when available. It has also been common in the past for trains and ships to dump their sewage into the natural environment increasing the pollution by the solids discharged as well as by the nutrients and disease-producing bacteria that may be found in the waste.

It is accordingly one object of the present invention to provide a low cost liquid waste treatment system requiring minimum maintenance, while providing for a safe disposal of liquid waste, especially in smaller treatment systems, such as with presently used septic tanks or which are limited in the amount of space available, such as on shipboard or trains, or the like.

Filter drum centrifuges operating on a filter principle have also been used in the past. These centrifuges typically have perforated sidewalls or a rotating drum which may or may not be covered with a filter cloth along the interior of the perforated wall. As the drum rotates, solid particles are retained on the inner wall of the drum and the liquid goes through the perforations and is caught by an outer wall for removal from the centrifuge. The best known example of this prior art filter drum centrifuge is a domestic spin dryer used in many households, but is also commonly used in industrial centrifuges. These machines are usually run intermittently; that is, they are filled with a mixture to be centrifuged, spin-dried and on completion of the treatment the drum is stopped and the material removed from along the walls. Continuous action filter drum centrifuge for the separation of solids from a liquid may provide the drum with an internal stationary scraper for continuously removing the solid material. These centrifuges are typically not used in sewage treatment since they would be of value only in removing the bulk solids or sludge from the sewage which can be done in a more economical manner by settling tanks, and the like.

It is accordingly another object of the present invention to provide a liquid waste treatment system utilizing a filter centrifuge which is both economical to operate and maintain while providing a very high degree of filtration for the liquid passing therethrough and to provide a unique system of disposing of solids, sedimentated along the walls thereof.

Finally, it is an object of the present invention to provide for the treatment of liquids in a perforated centrifuge drum lined with a filter material such as sand or diatomaceous earth and for a filter centrifuge having vanes on the periphery of the drum to act in conjunction with a diffuser casing to form a centrifugal pump integral with the filter.

SUMMARY OF THE INVENTION

The present invention teaches a liquid treatment apparatus having a rotatable filter drum with perforated walls along its periphery and a filter material located adjacent to and interior of the perforated walls so that the drum acts as the centrifuge when rotated. An inlet is provided for releasing liquid waste into the drum. Thus, rotation of the drum will force the liquid through the filter material while the filter material will prevent solids from passing therethrough and the casing surrounding the perforated walls of the drum will direct the liquid passing through the perforated walls from the apparatus. An electrical arc, torch, or the like, is placed in the rotating drum of the centrifuge, for burning solids trapped along the filter material and a vacuum may also be provided for vacuuming the burned ash, or a fixed nozzle issuing compressed air at a fixed point will blow burned solids into a container.

The present waste disposal system also provides for an inlet tank with a rough filter such as a screen with relatively large mesh therein and also mixing blades for mixing and forcing the sewage effluent through the wire mesh. This inlet tank may have means for starting and stopping a timer which activates a solenoid, or the like, for releasing the fluid into the centrifuge drum, and for stopping the input into the centrifuge drum and for activating the arc in a proper timing sequence after the liquid has been forced through the filter material. The vacuum for vacuuming the ash of the burned solid is also controlled by the timer. The system could of course be motor driven, such as a double shaft motor for driving both the mixing blades and the centrifuge, and the filter material could be sand, carbon, or diatomaceous earth, or the like, while the rotating drum could have turbine blade on the exterior of the periphery walls for driving the liquid from the casing and a chlorine input for sterilization would typically be provided in the system.

The present invention is also directed towards a high speed perforated drum centrifuge which is lined with sand, or the like, for filtering liquids fed into the drum and to such a centrifuge drum having vanes therein so as to act as an impeller of a centrifuge pump when used with the proper casing.

BRIEF DESCRIPTION OF THE DRAWINGS

Other objects, features and advantages of this invention will be apparent from a study of the written description and the drawings, in which.

DESCRIPTION OF THE PREFERRED EMBODIMENT

Figure 1:
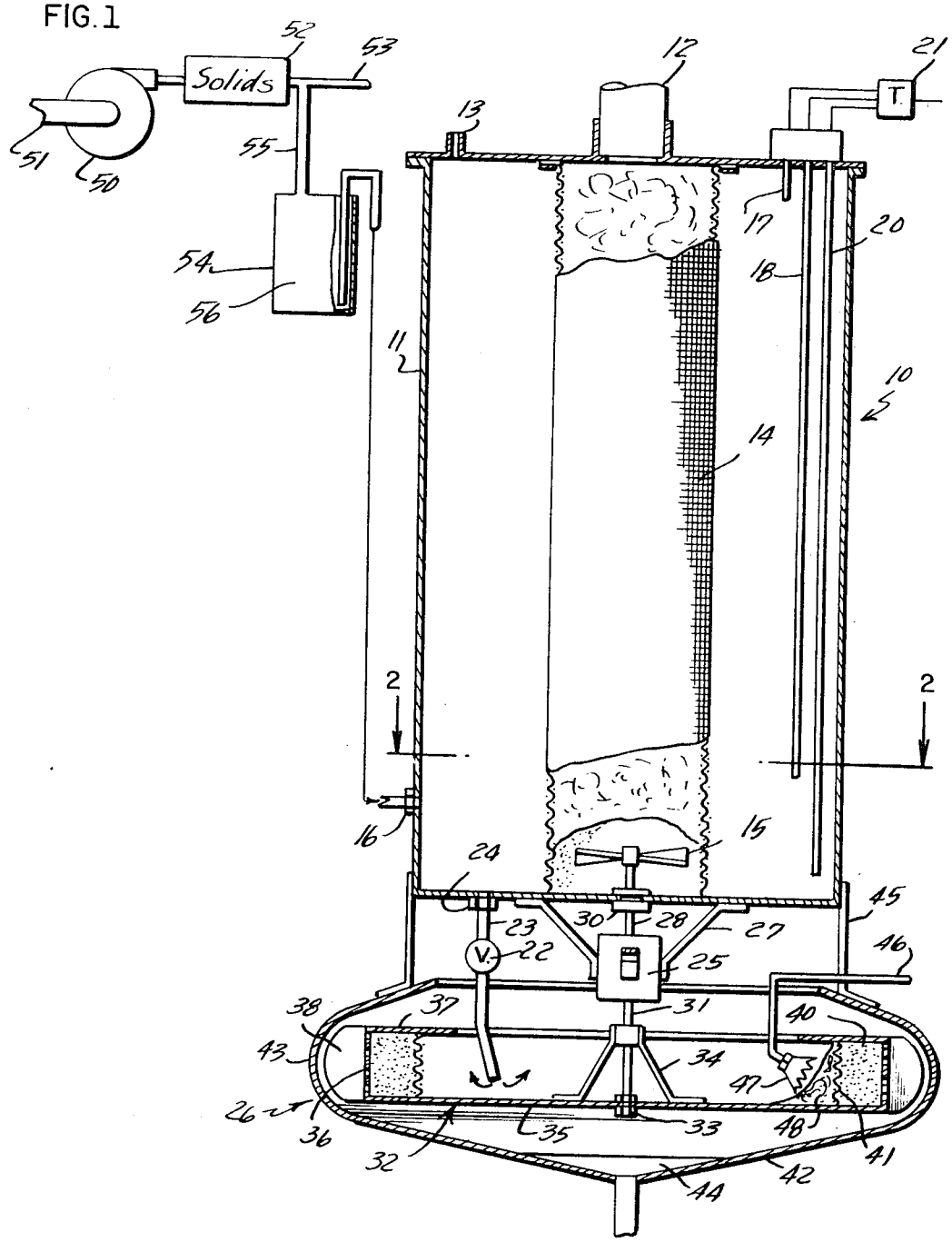
FIG. 1 is a cutaway section of the preferred embodiment of the present invention.

Referring now to the drawings in FIG. 1, a preferred embodiment 10 can be seen having a receiving tank 11 and a receiving inlet pipe 12, and a vent 13 so that raw sewage or other liquid waste can be received from a household, ship, train, or the like, at inlet 12 into tank 11. Inside tank 11 is a cylindrical screen 14 having a relatively large mesh for roughly screening the solids as well as to initially break up and mix solids with some of the liquids. Located inside the screen 14 is a mixing blade 15 which mixes up the solids with the liquids and provides additional circulation of the mixture through the screen 14. Blade 15 will typically drive the sewage toward the bottom of the tank 11 forcing circulation through the lower portion of the screen 14. Tank 11 also has chlorine inlet 16, chlorinating the sewage and electrodes 17, 18 and 20 connected to a timer 21. The electrodes are of different lengths and electrode 20 acts as a common, while electrode 18 which may be of a length to place it approximately 3 inches above impeller 15 for disengaging the timer when the level of liquid waste in tank 11 gets to a predetermined low point while electrode 17 would typically be very short to actuate the timer when the liquid level reaches a predetermined point in tank 11. Timer 21 activates a solenoid valve 22 located in an outlet pipe 23 connected to tank 11 at 24 for discharging liquid from tank 11 on the opposite side of the screen 14 from which the liquid waste is being received. Similarly, the timer activates the motor 25 which can be any commercially available motor but within the present embodiment has its drive shaft on both ends for driving the impeller 15 and the centrifuge 26, as will be described in more detail. Motor 25 is shown fixedly attached to tank 11 by brackets 27 and the upper motor shaft 28 passes through a seal 30 into tank 11. Seal 30 of course prevents escape of liquids along the shaft 28 into the motor 25. The lower shaft 31 of motor 25 is connected to filter drum 32 of a filter centrifuge and is bolted to the filter drum 32 at 33 and also has brackets 34 connected to the shaft 31 for additional support. Filter drum 32 has a solid bottom 35 and perforated sides 36 and may typically be cylindrical shaped. In this view filter drum 32 is shown having an overhang portion 37 and also blades 38 connected to the outside of the periphery of the walls 36. Filter drum 32 has a filtering material 40 such as sand, carbon, or diatomaceous earth, or other material, located around the inside of its periphery walls 36, which filter material may be held to the sides by a screen 41. Filter drum 32 is partially surrounded by a casing 42, which casing has side exits for the egress of fluid leaving the filter drum 32 under pressure from the vanes. These vanes form an impeller on the periphery of the drum which in connection with casing 42 and the tangential output 43 result in the filter also acting as a centrifugal pump. Also illustrated is an alternative gravity discharge 44 for fluids to exit from the system after having been filtered from the filter centrifuge. A casing 42 is shown held by brackets 45 to tank 11 making the present embodiment on integral unit. A pair of wires 46 are connected to a pair of electrodes 47 for generating an arc therebetween for burning accumulated solids on the filter illustrated generally at 48 which wires 46 are also interconnected with the timer 21 for actuation in the desired sequence. In addition to an electric arc, it is anticipated that a gas torch such as natural or LPG gas, or the like, could be used for burning the solids without departing from the spirit and scope of the invention.

Thus, at this point it can be seen that raw sewage enters inlet pipe 12 into tank 11 until it reaches a predetermined level as controlled by the electrodes 17, 18 and 20, at which time the timer 21 is activated switching motor 25 into an on position driving a mixing impeller 15 to more thoroughly mix the received liquids and solids and also rotating the centrifuge filter drum 32 and opening valve 22 in the outlet pipe 23 to release liquid waste into the rotating filter drum 32. The centrifugal action of the filter drum 32 drives the liquid waste towards this periphery, driving the liquids through screen 41, filter material 40 and the perforations in the outer wall 36 while stopping the solids 48 from passing through the filter. When the level in tank 11 reaches a predetermined point, the valve 22 is shut off but the motor 25 is allowed to continue running for a predetermined length of time until all the liquid has passed through the filter material 40 leaving the solids which are very quickly dried along the screen 41. At this point the electrodes 47 have a voltage applied creating the burning arc between them for burning solids indicated at 48 into a fine ash. The solids, it will of course be realized are primarily organic matter such as fecal waste, material such as paper, and the like, and can readily be reduced to a fine ash by the arc formed between the electrode 47. At the same time that the electrodes are activated, a vacuum cleaner comes on to remove the burned ash being burned by the electrodes. The liquid passing through the filter material 40 has been found to be a highly filtered fluid of the clarity of clear water and can be directed directly back into the water source either through exits 43 or 44 or both, as may be desired. A vacuum cleaner motor with impeller 50 draws air through the vacuum side of the vacuum 51 which is directed into the filter drum 32 for collecting burned ash when the vacuum 50 is in a running position. This burned ash is collected in a trap or filtered container 52 and the air exhausted at 53. However, the pressure side of this line can be used to feed a chlorine feeder 54, applying pressure through line 55 into the container 54 to drive the chlorine 56 through an exit 57 into the feeder nozzle of tank 11 at a predetermined rate and intermittently as the vacuum is driven. An air blower could be used in place of a vacuum cleaner without departing from the spirit of the invention.

It will be clear at this point that a liquid waste disposal system has been provided which can be built into a compact unit in an economical manner for treating home sewage or sewage on boats, trains, or as desired, and that the unit will have a small number of operating parts which are activated only as needed, thus requiring a minimum amount of maintenance for operation. The system can also be adapted for use with municipal and larger systems such as with industrial and plant waste.

Figure 2:
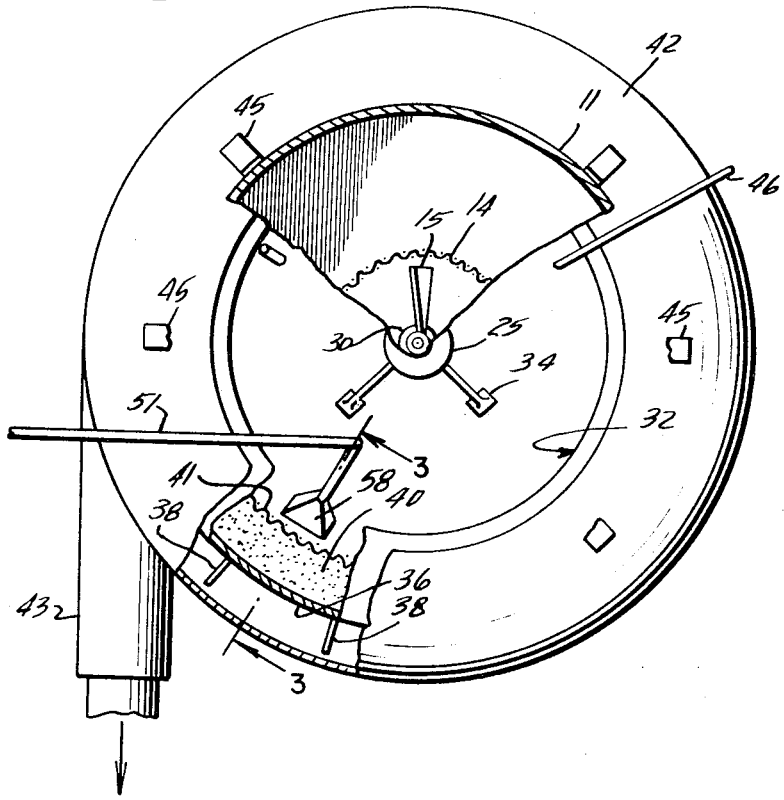
FIG. 2 is a view taken along line 2—2 of FIG. 1.
Figure 3:
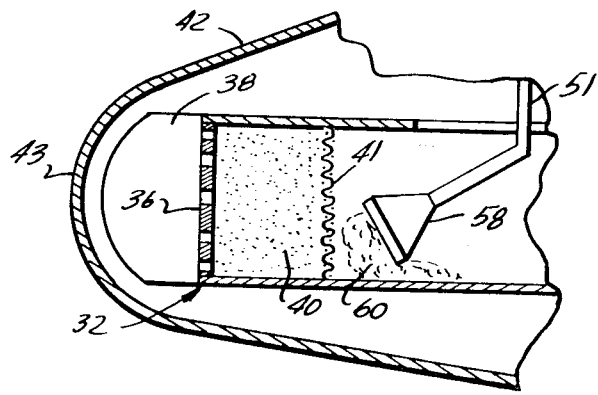
FIG. 3 is a cutaway portion illustrating a section of the drum and casing.

Turning now to FIG. 2, a top sectional view can be seen showing the layouts of the arc input 46 and a vacuum input 51 into the filter drum 32. This vacuum line 51 can be seen having a vacuum nozzle 58 located on the end for sucking burned ash from the filter drum 32. The drum can be seen as having the casing 42 surrounding the filter drum 32 with parts broken away to show the filter material 40 held by screen 41 on one side and the peripheral wall 36 on the other. Motor 25 can also be seen as can brackets 34, and a portion of tank 11 cut away to show screen 14 inside along with a portion of propeller 15. FIG. 2 provides a better view of the layout of certain features of the present invention while FIG. 3 illustrates a portion having vacuum nozzles 58 connected to vacuum line 51 for vacuuming ash 60 inside of filter drum 32. Drum 32 of course having screen 41, filter material 40, and the perforated outer walls 36 with blades 38 attached thereto for driving the liquid passing through the perforations in the wall 36 through the casing 42 exits. This is only one means of exiting the liquid passing through the filter material 40 and other means such as having the liquid directed by the casing 42 out a gravity drain is anticipated without departing from the spirit and scope of the present invention.

The filter system of the present invention depends upon a drum rotating at a high speed to produce sufficient $g$ force to force the liquid through the sand filter and preferably forcing the liquid through the sand in a relatively rapid manner. The filter drum as illustrated has vanes 38 attached in a manner to make the centrifuge filter into a centrifuge pump by forcing the fluid passing through the filter out the tangential exit 43. This filter - pump combination could also have the vanes 38 forming an impeller adapted to cooperate with a diffuser, similar to those found in commercial centrifugal pumps, for producing a more efficient pump for the liquid being filtered by the centrifugal filter. This filter - pump has the advantage of being useful for a great variety of functions other than waste treatment and it is anticipated that such uses are covered hereby. Thus, the centrifugal pump - filter combination would make an effective swimming pool or drinking water filter system not needing a separate pump and filter and not needing the large sand filters normally required. To complete such a system would merely require the addition of a chlorine or other disinfectant through a venturi or aspirator feeding and mixing system following the mixing and pumping.

Other variations and equivalents are also contemplated whether now known or not and this invention is not to be construed as limited to the particular forms disclosed herein since these are to be regarded as illustrative rather than restrictive.

I claim:
1. In a liquid waste treatment apparatus, the combination comprising:
   a. a rotatable filter drum having perforated walls along its periphery;
   b. inlet means adapted for releasing liquid waste into said drum;
   c. filter material located adjacent to and interior of said perforated walls whereby rotation of said drum will force liquid through said filter material and prevent solids from passing through said filter material;
   d. means for removal of solid materials from said rotatable filter drum including a suction nozzle located in said filter drum;
   e. casing means having side walls surrounding said perforated walls of said filter drum to direct liquid passing through said filter material from said apparatus;
   f. inlet tank means connected to said casing means for receiving liquid waste and controlling the intermittent feeding of said liquid waste from said inlet tank to said drum; and
   g. timer means connected to said inlet tank, said timer means being adapted to control the feeding of liquid waste to said filter drum in accordance with the level of liquid waste located in said tank.

2. The apparatus in accordance with claim 1 having burning means for burning solid material trapped by said filter drum, said burning means including an electric arc.

3. The apparatus in accordance with claim 1 in which said filter drum includes vanes on its periphery for directing liquid passing through said filter material from said casing.

4. The apparatus in accordance with claim 1 in which said filter material is sand.

5. The apparatus in accordance with claim 3 in which said inlet tank includes a chlorinator for feeding chlorine into said tank.

6. The apparatus in accordance with claim 3 in which said timer means controls the flow of liquid waste to said filter drum by means of a solenoid actuated valve.

7. The apparatus in accordance with claim 6 in which said inlet tank includes a screen separating the input of liquid waste from the outlet from said tank.

8. The apparatus in accordance with claim 7 in which said inlet tank includes a rotatable blade for circulating said liquid waste therein.

9. The apparatus in accordance with claim 8 in which the blade in said inlet tank and said rotatable drum are rotated by a common electric motor.

10. A liquid waste treatment apparatus comprising in combination:
    a. filter centrifuge means adapted to receive the liquid waste to separate solids from said liquid waste by passing said liquid waste through a filter medium; said filter centrifuge means having a rotatable filter drum having perforations in its peripheral walls and said filter medium being located adjacent to said perforations;
    b. burning means including an electric arc located inside said centrifuge means for reducing separated solids to ash;
    c. ash removal means for removing said ash from said centrifuge means, said ash removal means including a vacuum cleaner having a nozzle located in said filter drum; and
    d. output means for removing the filtered liquid from said centrifuge.

11. The liquid waste treatment apparatus in accordance with claim 10 including a timer actuated by the level of liquid waste in said tank means for controlling the sequence of drying solid waste in said filter centrifuge, actuating said burning means and actuating said ash removal means in a predetermined order.

* * * * *